United States Patent [19]  [11] 3,903,314
Chao  [45] Sept. 2, 1975

[54] PROCESS FOR TEXTURIZING MICROBIAL BROKEN CELL MATERIAL HAVING REDUCED NUCLEIC ACID CONTENT BY A DEEP OIL FRYING TECHNIQUE

[75] Inventor: Kwei C. Chao, Naperville, Ill.

[73] Assignee: The Standard Oil Company, Chicago, Ill.

[22] Filed: Apr. 12, 1974

[21] Appl. No.: 460,565

[52] U.S. Cl. ............... 426/656; 426/441; 426/506; 260/112 R
[51] Int. Cl. .............................................. A23j 3/00
[58] Field of Search ............ 426/62, 148, 204, 364, 426/369, 428, 212, 441; 95/1, 2, 28 R, 104; 260/112 R

[56] References Cited
UNITED STATES PATENTS
3,775,393 11/1973 Akin et al. ..................... 260/112
3,782,967 1/1974 Eriksen et al. ..................... 426/62

Primary Examiner—A. Louis Monacell
Assistant Examiner—R. A. Yoncoskie
Attorney, Agent, or Firm—Werten F. W. Bellamy; Arthur G. Gilkes; William T. McClain

[57] ABSTRACT

Protein containing broken microbial cell material is treated for nucleic acid removal and then texturized by homogenizing an aqueous slurry of ruptured cells and further conditioning the ruptured cells by a combination of heating, drying, and rehydration which may include pH adjustment, calcium treatment, and other formulation ingredients.

11 Claims, No Drawings

PROCESS FOR TEXTURIZING MICROBIAL BROKEN CELL MATERIAL HAVING REDUCED NUCLEIC ACID CONTENT BY A DEEP OIL FRYING TECHNIQUE

BACKGROUND OF THE INVENTION

In recent years much attention has been directed toward the development of new sources of protein for human consumption. There exists a need for protein material which can be incorporated in foods or usable as a basic proteinaceous substance for human consumption. Rapid increases in world population have made the continued dependence on traditional sources of protein highly impractical. Moreover, the supply of protein from typical sources of protein, such as animal meat and certain vegetables, is inadequate to provide balanced diets sufficient to satisfy needs of humans throughout the world. These factors coupled with the difficulties associated with providing protein from traditional sources because of drought, flooding and both animal and crop diseases gives critical significance to this situation.

One possible solution to the problem of supplying the ever increasing need for food protein is provided by processes for the bio-synthetic manufacture of protein through the growth of microorganisms of hydrocarbon or other substrates. It is known, for example, that microorganisms such as bacteria and yeast, which are grown by single-cell reproduction, contain high proportions of proteins and can be utilized directly in foods as whole-cell material or can be treated to recover protein isolate. Recent efforts have shown that microorganisms, grown on hydrocarbon substrates can be successfully used in animal feeds; but as yet these microorganisms have not been commercially accepted in food preparations suitable for human consumption.

With the development of successful processes for the synthetic production of protein-containing microorganisms (sometimes referred to herein as single cell proteins), an urgent need has developed for methods of texturizing such single-cell protein materials in a manner sufficient to render them suitable for use in food products. Generally, single-cell protein is initially produced as a wet paste and then is subsequently converted into dry powder form. This dry powder, similar in appearance and feel to flour, lacks the texture and food-like sensation to the mouth necessary to make an attractive food. Moreover, when placed in water, the powdered single-cell protein rapidly reverts back to single-cell form.

Ideally, therefore, it is desirable to impart properties such as chewiness, crispness, resistance to dispersion in water and the like to such single-cell proteins in order that they may be used to full advantage as additives to and substitutes for natural foods.

Various techniques are known in the art for effecting texture formation in soy bean based protein, such techniques are not generally applicable to single-cell technology and are ineffective in such application.

The use of "texturized vegetable proteins" (hereinafter referred to as TVP) in food products, especially as meat extenders or analogs has been increasing rapidly. Many people predict that the market for TVP may reach 10% of all domestic meat consumption by the year 1985. The technology of texturizing soy protein is well established. Presently, there are mainly two types of TVP produced on the market. Namely, the expanded vegetable protein is made by a thermoplastic extrusion technique and the spun vegetable protein by a fiber spinning technique. TVP is characterized as having structural integrity and identifiable texture. These features enable it to withstand hydration in cooking and other procedures used in preparing the food.

In order for single-cell proteins (SCP) to compete with vegetable seed proteins and to share the protein market in the future, it has to be texturized and processed for nucleic acid removal.

The human metabolic system produces uric acid as in the metabolism of ribonucleic acid (RNA). Since man does not have a uricase enzyme system, uric acid is not further broken down and is excreted with urine. Because uric acid has a very low solubility in water it will accumulate in the body in crystalline form if produced in larger quantities than the body can excrete. This may lead to the condition known as gout. It is, therefore, recommended by many nutritionists that the RNA intake in diet be kept at a low level.

Microbial cells, or single-cell protein (SCP) materials, contain from 4 to 30 percent or more nucleic acids according to their growth rates and the phase of growth. Usually, the higher nucleic acid contents of the microbial cells are associated with rapid growth phases. If the microbial cells are to be used as a protein source in human feeding, nutritionists recommend generally that the amount of nucleic acids contributed by SCP to diet should not exceed 2 grams per day.

The calculated RNA contents of some conventional protein sources are given in Table I. These vary from 0 to 4 percent. The RNA content of SCP generally ranges from 8 to 18 percent for exponential growth phase cells. In SCP intended for human consumption the RNA content should preferably be reduced to about 2 percent on cell dry weight basis.

TABLE I

RNA Content (Calculated) of Various Protein Sources

| FOOD | % RNA |
| --- | --- |
| Milk | 0 |
| Beans | 1.7 |
| Salmon | 2.4 |
| Chicken | 2.9 |
| Beef | 3.7 |
| Pork | 4.1 |
| Liver | 9.3 |
| Anchovies | 14.5 |
| SCP | 8 to 18 |

A preferred way of utilizing SCP material is in the form of broken cells. In this form, there is a need for the development of means for removing nucleic acids from the microbial cell material. This is desirably accomplished with a minimum loss of protein materials from the cells in order to maintain the nutritional attractiveness of such SCP materials.

An approach to accomplishing the above goals is to take advantage of the enzyme system already present within the unicellular microorganisms, activating the latent enzymes so that they act degradatively or hydrolytically in a selective manner upon the particular nucleic acid species present in the SCP material. One such process has been described in U.S. patent application Ser. No. 838,453, filed July 2, 1969, now abandoned, wherein magnesium ion is withheld from the nutrient system during fermentation to enhance the activity of RNase and simultaneously deactivate RNA polymerase. Preferred conditions include heating the microbial culture to 45° to 100°C. under alkaline conditions, cooling, and then adding glucose as a leakage promoter in a final fermentation stage.

Another process has been described by Ohta, Maul, Sinskey and Tannenbaum in a paper presented at the 160th ACS National Meeting, Chicago, Ill., September, 1970, where a very dilute (less than 1 wt.% cells) aqueous slurry of yeast cells is heated in a specific temperature cycle: very briefly (3–17 seconds) at 65°–70°C. to shock the cells; then 1–2 hours at 45°–50°C.; and finally about 1 hour at 55°–60°C. The heat-shock step is claimed to be critical. The optimum pH is from 5.0 to 6.5, in contrast to the alkaline conditons preferred in the first process above.

Both of the described process reduce the nucleic acid content of cellular materials but are limited to operation on the relatively dilute fermentation broths.

Relative to drying yeast material by deep oil frying, a procedure is described in the completed Holland specification No. 156,387, filed May 5, 1969. Briefly, this process relates to frying a yeast whole cell paste to obtain a product with meaty flavor. However, this document does not mention (1) the use of deep oil frying technique for texturization of yeast broken cells, (2) the importance of the removal of nucleic acid before the material is fried and (3) the rehydration step subsequent to frying the cell material.

SUMMARY OF THE INVENTION

One object of this invention is to provide a novel and improved process for texturizing broken cell microbial material which has been treated for the removal of nucleic acid to a level generally acceptable in food products intended for human consumption.

Another object is to provide new and useful food products and food ingredients comprising texturized SCP materials having a suitably low nucleic acid content.

The objects are accomplished by a process of adjusting the pH of an homogenized slurry of broken microbial cells to between 7.5 and 8.0 and then heating the cell slurry at a temperature of about 75° to 95°C. for about 5 to 30 minutes. The cell paste, with or without further calcium treatment, is added to an edible oil and stirred slowly as it is deep fried to texturized form. This texturized broken cell material may be rehydrated, modified by flavor additives or other formulation ingredients and redried.

The resulting improved SCP food component has lost substantially none of its protein content and contains a reduced amount of nucleic acids. This product can be used as a meat extender or snack food.

DESCRIPTION OF THE INVENTION

This invention relates to a novel method for texturizing broken cell microbial material which has been treated for the removal of nucleic acid together with the novel and improved food products obtained thereby.

It has been found that most of the nucleic acid content of single-cell microorganisms can be removed by adjusting the pH of an homogenized slurry of broken microbial cells under controlled temperature conditions. This is accomplished with essentially no attack on the protein material. The microbial cell material is added to an edible oil and stirred slowly as it is deep fried to texturized form. The resulting texturized product is crisp, crunchy, chewy, has a bland or pleasing taste and resists dispersion in water. This texturized product may be used as a snack, or rehydrated and used as an extender. Additionally, the dried broken cell material may be rehydrated by cooking with various ingredients based on formulation and then redried to be used as a snack or meat extender.

The practice of this invention is broadly applicable to microorganisms and particularly to those organisms classified as bacteria, yeasts, and fungi. By way of illustration bacteria such as those listed in Table II, yeasts such as those listed in Table III and fungi such as those listed in Table IV are suitable microorganisms.

TABLE II — Suitable Bacteria

*Acetobacter sp.*
*Arthrobacter sp.*
*Bacillus subtilis*
*Corynebacteria sp.*
*Micrococcus sp.*
*Pseudomonas sp.*

TABLE III — Suitable Yeasts

*Candida curvata*
*Candida lipolytica*
*Candida pulcherima*
*Candida utilis*
*Hansenula anomala*
*Hansenula miso*
*Oidium lactis*
*Saccharomyces carlsbergensis*
*Saccharomyces fragilis*
*Trichosporon cutaneum*
*Saccharomyces cerevisiae*
*Candida parapsilosis*
*Hansenula wickerhamii*
*Pichia pastoris*
*Pichia haplophyla*

TABLE IV - Suitable Fungi

| | |
|---|---|
| *Aspergillus niger* | *Penicillium notatum* |
| *Aspergillus glaucus* | *Penicillium chrysogenum* |
| *Aspergillus oryzae* | *Penicillium glaucum* |
| *Aspergillus terreus* | *Penicillium griseofulvum* |
| *Aspergillus itaconicus* | |

*Candida utilis*, *Saccharomyces cerevisiae*, *Saccharomyces fragilis*, and *Saccharomyces carlsbergensis* are preferred starting materials for the process of this invention, however, because each has been generally regarded by the F.D.A. as safe for use in food products.

Microbial cells suitable for the process of this invention may be grown aerobically in either a batch or continuous manner. Any suitable carbon-affording substrate may be employed although, for purposes of preparing SCP products for use in foods, an ethanol substrate is preferred. Any conventional combination of mineral nutrient elements may be employed. A convenient source of nitrogen is ammonia which may also be supplied to the fermentor as required to maintain the pH of the fermentation broth, preferably within the range from 3.5 to 5.5. Cells which have been grown at a rapid rate usually have a higher nucleic acid content while those grown more slowly tend to have a more permeable cell wall. Either of these types, as well as cells grown under oxygen-limiting or substrate-limiting conditions may be usefully treated according to the present invention to afford improved and acceptable foods and food components suitable for human consumption.

Rupture of the microbial cells may be accomplished by any suitable physical means at appropriate temperatures. Thus, for example, any homogenizer, colloid mill, ball mill or ultrasonic device may be employed.

Using oil as a heat transfer medium, frying is employed as the method for drying the broken microbial cell material. This drying process permits the escape of water vapor from the mass thereby causing the formation of porous structure of the fried material which gives a spongy texture when hydrated. The escaping water vapor carries some of the objectionable yeasty flavors and the frying imparts a meat like flavor.

The oil or fat used in the process of this invention may be any edible oil or fat, from animal or vegetable source, e.g., corn oil, peanut oil, lard, soya bean oil, palm oil or hydrogenated or partially hydrogenated palm oil, or partially hydrogenated, deodorized fish oil. Any edible oil or fat can be used with or without the addition of an antioxidant. However, different flavors and different problems of operation can be attributed to the kind of oil employed. It appears that the animal fats may have the advantage of giving genuine meaty flavor.

When the frying is conducted at lower temperatures, more oil is absorbed by the product. However, any excessive oil or fat can be removed by centrifugation or by a rehydration treatment.

The yeast material to be fried is usually bland in flavor or has a slight yeasty after-taste. This flavor can be improved greatly by adding flavoring material like artificial flavor, monosodium-glutamate, salt, pepper, sugar, etc. The light color can be modified with coloring agents and nutrients like vitamins, minerals, and amino acids, particularly methionine.

Various gelling or stiffening agents can be added to give proper consistency, elasticity and viscosity. This facilitates subsequent processing and texturization of the product. The calcium treatment serves such a purpose to give more flexibility in choosing the desired quality of texture and chewy eating character.

As a meat extender, the texturized product is to be used in wet form either rehydrated by the user immediately before being mixed with meat, or in the ready-to-use form which may be canned or in the frozen state. The rehydration is carried out by soaking or boiling the fried product in water and removing excess oil by decantation. Alternatively, the fried texturized product can be rehydrated in a precooking process wherein additives are formulated and added. The precooked texturized product can be used as a meat extender in a substance to be cooked or as a ready-to-eat cooked meat substitute. Moreover, it can be in moist form or fried again to give snack type food.

It is contemplated that the development of various specific food products is possible with modifications of the basic technique of deep oil frying which can be followed by hydration and precooking. The basic scheme of our inventive process to texturize the microbial cell material is depicted as follows:

DIAGRAM OF TEXTURIZING PROCESS

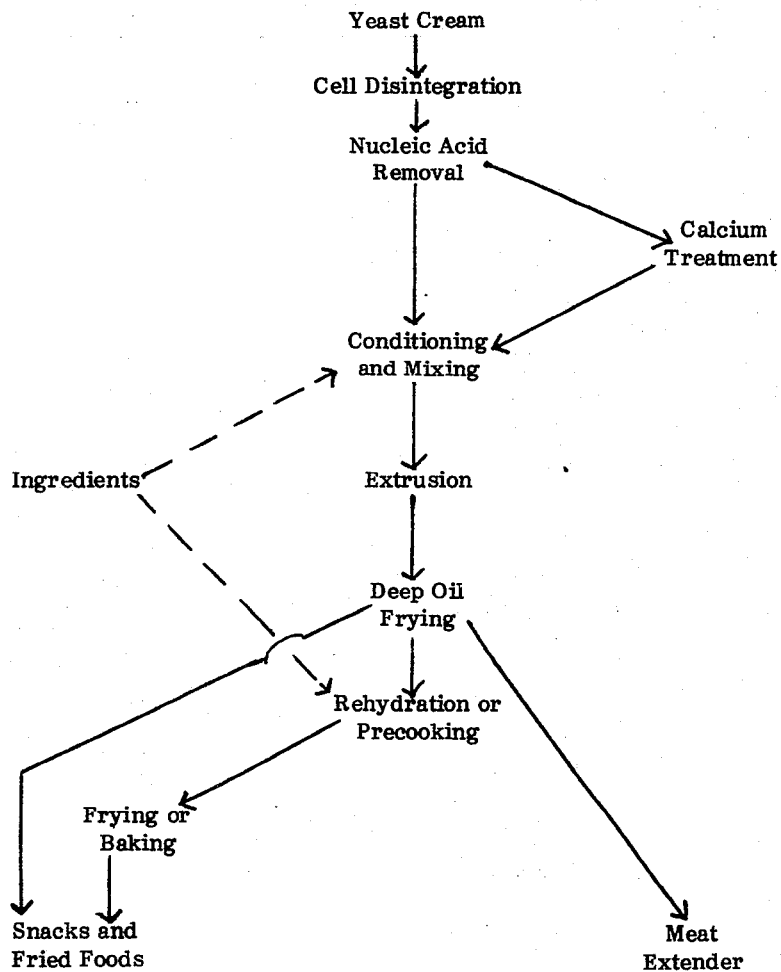

SPECIFIC EMBODIMENTS OF THE INVENTION

The following examples are illustrative, without limitation, of my invention.

EXAMPLE I

Yeast cells are disintegrated by passing through a Manton-Goulin homogenizer. The nucleic acid is removed by adjusting the pH to 7.5 to 8.0 and then heating to a temperature of 75° to 95°C. for 5 to 30 minutes. The heat-coagulated material is treated with calcium hydroxide thereby raising the pH to between 10 and 12 and heated to between 75° to 95°C., then cooled down right away. The mixture is neutralized back to pH 7.5 by adding 1 to 6 normal HCl and removing the excessive calcium ion in the form of calcium chloride. The recovered paste material has 73 percent moisture. A portion of the material is dropped into Wesson oil being heated at 160°C. The temperature drops to 110°C. right after the charge. The material submerged in the hot oil is carefully and slowly stirred to break up the soft mass into various smaller lumps. As the process is going on, the water is continuously removed as vapor, and the temperature is gradually rising, with the accompanyment of changes of dimension, density, texture and color. The material is completely dried as the temperature comes back to about 160°C. with browned color and crispy texture. The fried material is passed through a strainer to remove the excessive oil. The product is crispy and tastes like ground meat. No yeasty flavor or odor could be detected. It has a porous structure and when hydrated, by boiling in water, it swelled and became elastic with a spongy structure. Hamburger test indicates that the flavor and texture are acceptable when 15 grams of the moist texturized material (corresponding to 7.5 grams of dry matter) are mixed and cooked with 100 grams of fresh hamburger meat.

EXAMPLE II

The material is prepared as described in EXAMPLE I and then charged to the hot oil at 150°C. in the form of strands by injecting through a syringe. Because of the low ratio of the material to the oil, no drastic change of temperature is observed. The material in the form of strands is quickly fired within 1 minute. The readiness of the process can be judged by the change of density. The fried material sinks to the bottom of the oil bath. The material still keeps its strand form, but has irregular surface and a porous structure made up of many individual hollow cell pockets. The strands can be entangled during frying to give the appearance of mesh work.

EXAMPLE III

The yeast material is prepared as described in EXAMPLE I, except that no calcium treatment is carried out. The paste has a higher moisture content of 83 percent. After it is fried and rehydrated, the material has softer texture which appears to be more compatible with hamburger meat than the one prepared in EXAMPLE I. A difference in flavor cannot be noticed. The material is less chewable than the one treated with calcium.

EXAMPLE IV

The fried material as obtained in EXAMPLE I is rehydrated by cooking in a formulated juice composed of artificial beef flavor, monosodium glutamate, hydrolyzed vegetable protein, sugar, salt and pepper. The material is cooked until the juice is concentrated to almost dryness. The moist cooked material tasted like cooked ground beef. The wet cooked material is further dried in a hot air oven at 70° – 80°C. until it is dried and crispy. The dried preparation tasted like fried meat bits.

EXAMPLE V

The procedure of EXAMPLE IV, except that no artificial beef flavor was added. The cooked material tasted like liver.

I claim:

1. A process for developing texture in broken microbial cell material, comprising the steps of:
   a. preparing an aqueous slurry of said microbial cell material, containing from about 5 to about 15 wt. % cells;
   b. disintegrating the cells in the slurry by passing them through a homogenizer;
   c. removing nucleic acid from the homogenized cell slurry by adjusting the pH to between 7.5 and 8.0, and then heating the cell slurry at a temperature of about 75° to 95°C. for about 5 to 30 minutes;
   d. adjusting the pH of the homogenized cell slurry, having reduced nucleic acid, from step (c) with calcium hydroxide to between 10 and 12, heating the said slurry up to about 75° to 95°C. and then cooling immediately, neutralizing with hydrochloric acid to a pH of 7.5 and removing the excessive calcium ion in the form of calcium chloride;
   e. recovering the homogenized cell slurry from step (d) and adding a portion thereof to an edible oil having a temperature from about 120° to 160°C;
   f. stirring the homogenized cell slurry as defined in step (e) and the edible oil mixture thereby breaking up the soft mass of cell material into smaller lumps and frying to effect the continuous removal of water as vapor; and
   g. removing the excess oil by passing the fried cell material through a strainer to produce a product which is crisp, crunchy, chewy, has a bland or pleasing taste and resists dispersion in water.

2. A process of claim 1 wherein the product from step (g) is rehydrated by boiling it in water and recovering the product which is elastic and has a spongy structure.

3. A process of claim 1 wherein the rehydration of the product from step (g) is carried out in the presence of a formulated juice consisting essentially of artificial flavor, meat seasonings and enhancers, sugar, salt and pepper.

4. A process of claim 3 wherein the formulated juice consists essentially of meat seasonings and enhancers, sugar, salt and pepper.

5. A process of claim 3, wherein the rehydrated product is dried in a hot air oven at 70° – 80°C. to produce a product which is crisp, crunchy, chewy and tastes like beef.

6. A process of claim 4 wherein the rehydrated product is dried in a hot air oven at 70° – 80°C. to produce a product which is crisp, crunchy, chewy and tastes like liver.

7. A process of claim 1 wherein the broken microbial cells are yeast cells.

8. A process of claim 7 wherein the yeast is selected from the group consisting of *Saccharomyces cerevisiae*,

*Saccharomyces carlsbergensis*, *Saccharomyces fragilis* and *Candida utilis*.

9. A process of claim 8 wherein the yeast is *Candida utilis*.

10. A process of claim 1 wherein the broken microbial cells are bacteria cells.

11. The process of claim 1 wherein the broken microbial cells are fungi cells.

* * * * *

UNITED STATES PATENT OFFICE
CERTIFICATE OF CORRECTION

Patent No. 3,903,314            Dated September 2, 1975

Inventor(s) Kwei C. Chao

It is certified that error appears in the above-identified patent and that said Letters Patent are hereby corrected as shown below:

Column 1, line 27, "of hydrocarbon" should be
-- on hydrocarbon --.

Column 9, line 1, "carisbergensis" should be
-- carlsbergensis --.

Signed and Sealed this twenty-fifth Day of November 1975

[SEAL]

Attest:

RUTH C. MASON
Attesting Officer

C. MARSHALL DANN
Commissioner of Patents and Trademarks